United States Patent [19]

Bailey

[11] Patent Number: 4,499,227

[45] Date of Patent: Feb. 12, 1985

[54] THERMOPLASTIC RESIN COMPOSITION HAVING HIGH IMPACT STRENGTH

[75] Inventor: Fay W. Bailey, Bartlesville, Okla.

[73] Assignee: Phillips Petroleum Company, Bartlesville, Okla.

[21] Appl. No.: 557,514

[22] Filed: Dec. 2, 1983

[51] Int. Cl.³ .......................... C08K 3/34; C08K 5/09; C08K 5/01; C08K 9/04

[52] U.S. Cl. .................................... 524/399; 524/397; 524/394; 524/400; 524/449; 523/216; 523/351

[58] Field of Search ............... 524/449, 399, 400, 397, 524/394; 523/216

[56] References Cited

U.S. PATENT DOCUMENTS

| | | | |
|---|---|---|---|
| 2,562,004 | 7/1951 | Watson, Jr. et al. | 524/449 |
| 3,368,996 | 2/1968 | Beacham et al. | 524/449 |
| 3,763,059 | 10/1973 | Needham et al. | 524/449 |
| 3,939,112 | 2/1976 | Needham | 524/449 |
| 3,976,608 | 8/1976 | Buckler | 524/449 |
| 4,165,302 | 8/1979 | Armenti et al. | 524/449 |
| 4,282,131 | 8/1981 | Trousil | 524/449 |
| 4,304,699 | 12/1981 | Keeney | 524/449 |
| 4,325,850 | 4/1982 | Mueller | 524/449 |
| 4,328,146 | 5/1982 | Andy | 523/216 |
| 4,340,516 | 7/1982 | Keeney | 523/216 |
| 4,385,136 | 5/1983 | Ancker | 523/216 |
| 4,390,652 | 6/1983 | Isley | 524/449 |
| 4,429,064 | 1/1984 | Marzola | 524/449 |
| 4,430,468 | 2/1984 | Schumacher | 524/449 |
| 4,442,243 | 4/1984 | Woodhams | 524/449 |
| 4,454,281 | 6/1984 | Heitz | 524/399 |

Primary Examiner—C. Warren Ivy

[57] ABSTRACT

A high impact resistant composition consisting essentially of a thermoplastic resin blended with an admixture of mica and at least one ingredient selected from the group consisting of polybutylenes, metal salts of long-chain fatty acids, and mineral oils.

22 Claims, No Drawings

THERMOPLASTIC RESIN COMPOSITION HAVING HIGH IMPACT STRENGTH

This invention relates to thermoplastic resin compositions having high impact strength as well as a process for making them.

Since thermoplastic resins are frequently molded into articles of manufacture, it is desirable that they have strength, clarity, processability, and environmental durability. For many applications of these thermoplastic resins, their impact strength is an important feature since the impact strength is in part a measure of the plastic objects durability. The higher the impact strength of a certain resin, the less likely it is that an article made from this resin will break when subjected to impacts or when dropped. It would therefore be desirable to be able to increase the impact strength of the thermoplastic resins.

It is thus one object of this invention to provide a process for the production of thermoplastic compositions.

Another object of this invention is to provide novel thermoplastic compositions having high impact resistance.

Other aspects, objects, and the several advantages of the present invention are apparent from the specification and the appended claims.

In accordance with the present invention I have found that a composition of matter consisting essentially of a mixture of a thermoplastic resin and mica which has been premixed with at least one ingredient selected from the group consisting of polybutylenes, metal salts of long-chain fatty acids, and mineral oils possess an impact strength which is drastically increased over the impact strength of the thermoplastic resin mixed with untreated mica.

The thermoplastic resins useful in forming the novel compositions of this invention are those selected from the group consisting of polyethylene, polypropylene, polybutylene, polystyrene, vinyl acetate-ethylene copolymers, butadiene-styrene copolymers, and homo- and copolymers of acrylic acid and derivatives of acrylic acid.

Presently preferred is polyethylene having a melt index within the range of 1 gram/10 minutes as defined by ASTM 1238-65T Condition F to 200 grams/10 minutes as defined by ASTM 1238-65T, Condition E.

Any type of mica commercially available may be used in the present invention. Exemplary micas are: muscovite, paragonite, lepidolite, zinnivaldite, biotite, phlogopite, lepidomelane, roscoelite, and mixtures thereof. Any particle size mica conventionally employed as a filler can be used. However, mica having a particle size between about 1 to about 500 microns is preferred.

The polyisobutylenes useful in ths invention are limited to those materials having melting points below 37.8° C. (100° F.). Generally, this will include polyisobutylenes having molecular weights in the range of about 500 to 5,000.

Fatty acid metal salts useful in this invention are those materials represented by the formula:

$$(RCOO)_nM$$

wherein R can be any alkyl or alkenyl radical having from 9 to 25 carbon atoms; M can be any metal in Groups IA, IIA, or IIB of the Periodic Table; and n is the valence of M. Exemplary of such materials are, for example, the lithium, sodium, potassium, rubidium, cesium, magnesium, calcium, strontium, barium, zinc or cadmium salts of the following fatty acids:

Saturated Fatty Acids

Capric Acid, Lauric Acid, Myristic Acid, Palmitic Acid, Stearic Acid, Arachidic Acid, Behenic Acid, Lignoceric Acid, and Cerotic Acid and mixtures thereof

Unsaturated Fatty Acids $\Delta^{9,10}$-Decylenic Acid, Palmitoleic Acid, Oleic Acid, Ricinoleic Acid, Linoleic Acid, Linolenic Acid, Tariric Acid, Arachidonic Acid, Erucic Acid, and Selacholeic Acid, and mixtures thereof.

Any type mineral oil can be employed in this invention. Generally, this will include naphthenic extender oils employed in rubber formulations comprised of about 30 to 60 weight percent naphthenics, 30–60 weight percent paraffins and 5 to 20 weight percent aromatics. These mineral oils have a viscosity in the range of about 100 to 5,000 SUS at 37.8° C. (100° F.). Mineral oils substantially free of aromatics can also be used.

The above materials can be present in the inventive composition in the following amounts:

| Material (parts by wt.) | Ranges (parts by wt.) Broad | Preferred |
| --- | --- | --- |
| Thermoplastic resin | 100 | 100 |
| Mica | 5–60 | 10–50 |
| Ingredient (polyisobutylene, metal salt of fatty acid, mineral oil) | 0.1–2 | 0.2–1 |

In accordance with the present invention, the mica is mixed in any convenient manner, preferably dry mixed, with any one of the above three additives or combinations thereof and then blended with the thermoplastic resin. Both the mixing and blending can be carried out in any conventional manner such as those used in the following Examples.

The compositions of this invention can also contain small amounts of conventionally employed additives such as stabilizers, antioxidants, antiblocking agents, pigments and the like.

The following examples further illustrate the present invention.

EXAMPLE I

This example illustrates the method used to prepare pelletized mica-polyethylene-ingredient blends to be subsequently molded and tested: Into a Henschel mixer (Model 2J55) was placed 600 grams of mica (Suzorite ® 200 HK from Marietta Resources International, Ltd.) and 6 grams of polyisobutylene,  1000 (Oppanol ® LR-8199, BASF Wyandotte Corp.) and the blend dry mixed at high speed for one minute at ambient room temperature. Then 1394 grams of polyethylene fluff having a melt index of 10 and a density of 0.950 (HXM50100 from Phillips Petroleum Co.) was added to the blend and mixed for two minutes at ambient room temperature.

This powder blend was then fed into a Davis-Standard one and one-half inch extruder (Model 150S) under the following conditions: 2.2:1 compression screw ratio; 200° C. back zone, 235° C. die; 75 RPM through a 20 mesh screen pack. The extrudate was then run through a Cumberland pelletizer to provide one-eighth inch pellets.

EXAMPLE II

This example illustrates the method used to mold and test the inventive composition. The pellets prepared in Example I were fed into a new Britain injection molding machine (Model 75B) using the following conditions:

| Barrel Temp. | 270° C. |
|---|---|
| Mold Temp. | 50° C. |
| Screw Speed | 104 RPM |
| Injection Speed | maximum-fast |
| Back Pressure | 800 KPa |
| Injection Pressure | 11,000 KPa |
| Holding Pressure | 9,000 KPA |
| Holding Time | 15 seconds |
| Cooling Time | 30 seconds |
| Total Cycle Time | 42 seconds |

The molded bars prepared as described were then evaluated. The results of this evaluation are listed in Table I below:

TABLE I

Performance Properties of Polyethylene/Mica-Additive Blends

Wt. %

Formulation: 69.7 Polyethylene (HXM50100)
30.0 Mica 200 HK (particle size, 80 microns)
0.3 Ingredient

| | | 0.3 Wt. % Additive | | |
|---|---|---|---|---|
| Performance Property | No Ingredient | Poly-Iso-butylene[a] | Zinc Stearate | Mineral Oil |
| 1. Flexural Modulus, MPa, 25° C.[b] | 3288 | 3134 | 3150 | 2919 |
| Flexural Modulus, MPa, 82° C. | 825 | 787 | 739 | 813 |
| 2. Tensile yield, MPa, 82° C.[c] | 20 | 17 | 15 | 18 |
| Tensile break, MPa, 82° C. | 14 | 12 | 11 | 13 |
| 3. % Elongation[d] | 32 | 41 | 57 | 37 |
| 4. Izod Impact, Notched, J/m[e] | 126 | 231 | 423 | 190 |
| Gardner Impact, cm-kg/mm[f] | 15 | 19 | 24 | 16 |

[a]Oppanol ® LT-8199, BASF Wyandotte Corp.
[b]Flexural Modulus measured in accordance with ASTM D-790.
[c]Tensile Strength measured in accordance with ASTM D-638-72.
[d]% Elongation measured in accordance with ASTM D-638-72.
[e]Izod Impact measured in accordance with ASTM D-256-72.
[f]Measured by dropping a 2 lb. wt. onto the flat surface of a 2.5 in. × 0.05 in. molded disc using a Gardner Variable Impact Tester and observing at what level 50 percent of the samples tested do not crack through the specimen.

The above data show that when mica is mixed with one of the different types of ingredients and then mixed with polyethylene that the impact resistance of the resulting composition is greatly increased (see 4).

In addition, the percent elongation (see 3) is increased while maintaining about the same flexural strength (see 1).

Reasonable variations and modifications which will be apparent to those skilled in the art can be made in this invention without departing from the spirit and scope thereof.

I claim:

1. A thermoplastic composition consisting essentially of a mixture of:
   (a) 100 parts by weight of at least one thermoplastic resin selected from the group consisting of polyethylene, polypropylene, polybutylene, polystyrene, vinyl acetate-ethylene copolymers, butadiene-styrene copolymers, and homo- and copolymers of acrylic acid; and
   (b) 5-60 parts by weight of particulate mica filler premixed in the absence of a thermoplastic resin with 0.1-2 parts by weight of at least one ingredient selected from the group of
      (i) polybutylenes having a melting point below about 100° F.;
      (ii) fatty acid metal salts of the formula:

$(RCOO)_nM$ wherein R is an alkyl or alkenyl radical having from 9 to 25 carbon atoms, M is a Group IA, IIA, or IIB metal; and n is the valence of M; and
      (iii) mineral oils.

2. A thermoplastic composition according to claim 1 consisting essentially of 100 parts by weight of said thermoplastic resin and 10-50 parts by weight of said mica premixed with 0.2-1 parts by weight of said ingredient.

3. A composition according to claim 1 wherein said thermoplastic resin is polyethylene having a melt index within the range of about 1 gram/10 minutes as defined by ASTM 1238-65T, Condition F to about 200 grams/10 minutes as defined by ASTM 1238-65T, Condition E.

4. A composition according to claim 1 wherein said mica has a particle size between about 1 to 500 microns.

5. A composition according to claim 4 wherein said mica has a particle size between about 10 to 200 microns.

6. A composition according to claim 1 wherein said polybutylene is polyisobutylene.

7. A composition according to claim 1 wherein said fatty acid metal salt is zinc stearate.

8. A composition according to claim 1 wherein said mineral oil is a naphthenic extender oil.

9. A composition according to claim 1 consisting essentially of polyethylene blended with an admixture of mica and polyisobutylene.

10. A composition according to claim 1 consisting essentially of polyethylene blended with an admixture of mica and zinc stearate.

11. A composition according to claim 1 consisting essentially of polyethylene blended with an admixture of mica and naphthenic extender oil.

12. A process for making a high impact resistant thermoplastic composition comprising:
   (a) mixing in the absence of a thermoplastic resin 5-60 parts by weight of particulate mica filler with 0.1-2 parts by weight of at least one ingredient selected from the group consisting of:
      (i) polybutylenes having a melting point below about 100° F.;
      (ii) fatty acid metal salts of the formula:

$(RCOO)_nM$ wherein R is an alkyl or alkenyl radical having from 9 to 25 carbon atoms, M is a Group IA, IIA, or IIB metal; and n is the valence of M; and (iii) mineral oils; and (b) thereafter blending 100 parts by weight of at least one thermoplastic resin selected from the group consisting of polyethylene, polypropylene, polybutylene, polystyrene, vinyl acetate-ethylene copolymers, butadienestyrene copolymers, and homo- and copolymers of acrylic acid with the resulting mixture of 1(a).

13. A process according to claim 12 employing 10-50 parts by weight of said mica and 0.2-1 parts by weight of said ingredient.

14. A process according to claim 13 wherein said thermoplastic resin is polyethylene having a melt index within the range of about 1 gram/10 minutes as defined by ASTM 1238-65T, Condition F to about 200 grams/10 minutes as defined by ASTM 1238-65T, Condition E.

15. A process according to claim 12 wherein said mica has a particle size between about 1 to 500 microns.

16. A process according to claim 15 wherein said mica has a particle size between about 10 to 200 microns.

17. A process according to claim 12 wherein said polybutylene is polyisobutylene.

18. A process according to claim 12 wherein said fatty acid metal salt is zinc stearate.

19. A process according to claim 12 wherein said mineral oil is a naphthenic extender oil.

20. A process according to claim 12 wherein polyethylene is blended with an admixture of mica and polyisobutylene.

21. A process according to claim 12 wherein polyethylene is blended with an admixture of mica and zinc stearate.

22. A process according to claim 12 wherein polyethylene is blended with an admixture of mica and naphthenic extender oil.

* * * * *